Patented Sept. 17, 1929

1,728,565

UNITED STATES PATENT OFFICE

AUGUST HARTMANN, OF BARMEN-LANGERFELD, GERMANY, ASSIGNOR, BY MESNE ASSIGNMENTS, TO AMERICAN BEMBERG CORPORATION, A CORPORATION OF DELAWARE

COPPER-OXIDE AMMONIA-CELLULOSE SOLUTION FOR SPINNING ARTIFICIAL SILK BY THE STRETCH-SPINNING PROCESS

No Drawing. Application filed February 5, 1925, Serial No. 7,152, and in Germany June 24, 1924.

In the preparation of copper oxide ammonia cellulose solution for the spinning of artificial silk by the stretch-spinning process an effort is made on grounds of economy to use up the whole of the available copper for dissolving cellulose.

In the process that is usual in practice, wherein basic copper sulphate and ammonia receive a further addition of soda lye in order to dissolve the maximum amount of cellulose, the ratio of the quantities of copper and cellulose employed amounts to about 1:2.3. If on the other hand pure, dry copper hydroxide stable to heat is employed, which can be produced according to a known process by treating basic copper sulphate with soda lye, the cellulose dissolves therein in the presence of ammonia in the proportion of 2.6:1 part of copper, which constitutes a considerable saving of copper. This greater solubility of cellulose (i. e. solubility of a greater quantity of cellulose) relatively to a given quantity of copper is apparently based on the absence of any salts, and, in the particular case, of sodium sulphate.

This addition of sodium sulphate or similar salts made after the cellulose is dissolved has no influence on the proportion of copper and cellulose existing in the solution previous to such addition. It results in no separation or precipitation so that the gain in the percentage of cellulose of the solution due to the employment of pure copper hydroxide is maintained.

These solutions prepared with pure copper hydroxide require, for the obtaining of soft and best silk, a comparatively high temperature of the precipitating bath when spinning. Now it has been discovered that certain additions of salts which in solution constitute electrolytes, in particular of sodium sulphate, to the prepared spinning solution, reduce the spinning temperature requisite for obtaining best silk. Sodium sulphate is here given as an example of an electrolyte consisting of a soluble salt of an alkali metal but the invention is not restricted to this particular salt. If, upon working up a copper oxide ammonia cellulose solution prepared from pure copper hydroxide the spinning temperature was for example 45°, with the addition of sodium sulphate to the prepared solution, the temperature of the precipitating bath can without any disadvantage for the carrying out of the spinning process and the production of best silk, be reduced to 30° and even lower, according to the quantity of sodium sulphate added. This subsequent addition of sodium sulphate has no influence on the proportions of copper and cellulose already existing in the solution, and in particular there results therefrom no separation of the additional cellulose dissolved in the spinning solution in consequence of the employment of pure copper hydroxide.

Example

To a copper oxide ammonia solution prepared from 100 kilogrammes of cotton, 59 kilogrammes of pure copper hydroxide and 300 litres of ammonia is added, according to the reduction of temperature desired, from 1 to 5 per cent of $Na_2SO_4$ in the form of a 10 per cent solution.

What I claim is:—

In the preparation of a copper oxide ammonia cellulose solution comprising cellulose dissolved in a mixture of pure copper hydroxide and ammonia, for the spinning of artificial silk by the stretch spinning process, the addition after the solution of the cellulose of sodium sulphate.

In testimony whereof I have signed my name to this specification.

AUGUST HARTMANN.